3,681,274
AMMONICAL FLUORIDES FOR FORMALDEHYDE
RESIN SYSTEMS
Walter Richard Oetgen and James Cooley, Orangeburg,
S.C., assignors to U.S. Plywood-Champion Papers Inc.,
New York, N.Y.
No Drawing. Filed July 23, 1970, Ser. No. 57,756
Int. Cl. C08g 51/18, 51/82
U.S. Cl. 260—17.3 R    2 Claims

ABSTRACT OF THE DISCLOSURE

An improved catalyst for amino resins, said catalyst being selected from the group consisting of ammonical fluorides. The resin catalyst system herein described is particularly useful in the rapid production of laminated materials, such as plywood, veneer faced hardboard, furniture, counter tops, etc.

---

The present invention is particularly concerned with an improved catalyst for the curing of amino resins, especially with formaldehyde type resins. The invention more generally is concerned with the efficient production of high quality plywood panels utilizing as the bonding agent for the respective plies the present novel resin catalyst system.

Thus the resin catalyst system of the present invention is particularly adapted for use in the production of plywood panels, or other laminates such as plies of paper, in that the resin system possesses both long pot life and a shorter curing time when compared to the resins which are being currently used in the plywood industry. The catalyst of the present invention is particularly for use with formaldehyde type resins and is selected from the group consisting of the ammonical fluorides.

Plywood is a widely used laminated wood product whose laminates or plies are arranged so that the grains of adjacent layers are at right angles to each other. These laminations, plies, or sheets are secured to each other by a thin layer of an appropriate adhesive which is coated on each interior wood face and then cured by the combined action of heat and pressure. While most woods are subject to swelling and contraction as a result of changes in moisture and temperature, this cross grain characteristic imparts a marked degree of dimensional stability to plywood panels. Since swelling is a natural characteristic of any wooden article, it is evident that this enforced dimensional stability imposes tremendous strains throughout the wooden structure. Thus the properties of the adhesive, which must absorb these strains are critical in the performance of plywood in its desired ultimate use.

Thus the invention relates to an improved catalytic system for the curing of formaldehyde type resins, particularly amino formaldehyde type resins when used for the efficient production of high quality plywood panels. The invention more specifically relates to the curing of melamine-formaldehyde and melamine-urea-formaldehyde resins or mixtures and combinations thereof designed for use as adhesives, coatings, mouldings and laminates.

Urea-formaldehyde resins are the condensation products of urea and formaldehyde in the presence of bases as illustrated in the following reactions:

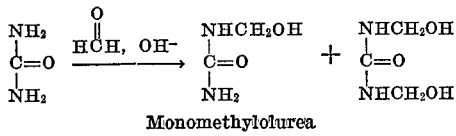
Monomethylolurea
Dimethylolurea

In the presence of an acidic catalyst various intermediate products, such as methyleneurea, methylolmethyleneurea, etc., condense to form a complex cross-linked structure which may be illustrated as follows:

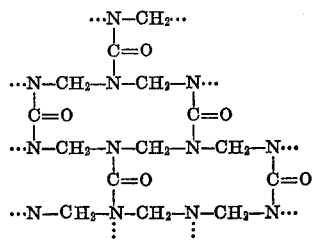

The chemistry and use of the melamine resins are entirely similar to those of the urea resins. The resins are condensation products in the presence of acid catalyst of hexamethylolmelamine:

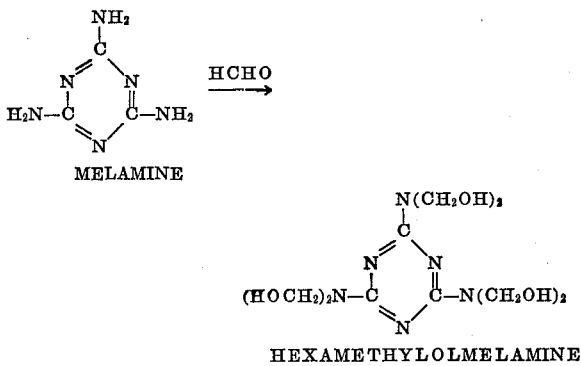

HEXAMETHYLOLMELAMINE

Thus the monomers are cross linked by the action of the acid catalysts.

In the manufacture of amino resins, the first step is methylolation of the —NH group in melamine and urea with formaldehyde initially forming mono-or dimethylol monomers. The mono or dimethylol urea monomer and hexamethylol melamine monomer may further react with alcohol to form ethers useful in the manufacture of coatings.

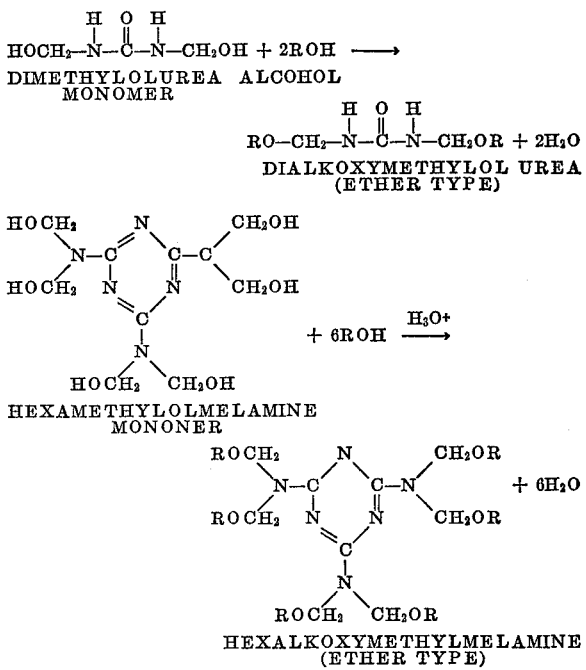

Other structures or modifications are possible and the above is given by way of illustration rather than limitation on this invention.

Generally the selection of an acid catalyst for curing amino-formaldehyde resins is controlled by the necessity of having both a reasonable pot life of the catalyzed mixture, and a minimum curing time after the catalyzed resin is applied to the ply surfaces. Strong acids give fast cure time but the catalyzed mixture has such short pot life that the use of the strong acid is economically impractical. Weaker acids, while extending the pot life of the system do not cure at a rate to sustain a commercial operation. The most commonly used catalysts are salts of strong acids and weak bases, such as ammonium chloride or ammonium sulfate, or the weaker organic acids, such as toluene sulfonic acid or the various organic phosphates.

Thus the catalyst systems are a compromise between two factors, the resin's pot life and the curing time which affects the production rate. The pot life is the time after the catalyst has been added to the resin, in which the resin must be used or be disposed of as worthless. The curing time is the length of time required for a resin once it has been applied to the substrata to cross link or cure to its final hardness and thoroughly bind the respective plies one to the other. The catalyst of the present invention gives both long pot life and fast cure time which results in a very desirable excellent production rate.

The present catalyst system consists of the ammonical fluorides. Especially desirable is ammonium bifluoride, because of its very high percentage of available hydrofluoric acid, its marked water solubility and its commercial availability. This catalytic process is especially adapted for curing amino-formaldehyde type resins to be used as an adhesive in making high grade hot-pressed plywood.

Thus the present invention provides a catalyst which when used in the curing of amino resins has such superior reactivity as to be capable of being hot-pressed at appreciably lower temperature and at an appreciably shorter pressing cycle, and yet produce high quality types I, II and III plywood which meet commercial standards directly upon discharge from the hot press. Also, with lower temperatures and shorter pressing times the plywood moisture content doesn't drop significantly; thereby eliminating the need for a separate remoistening stage after the pressing stage. This is necessary to keep down buckling and warping of the paneling and to avoid embrittlement of or injury to the wood panel. The present technique produces an aqueous liquid adhesive which combines the desired high reactivity of the catalyst with adequate stability of pot life for successful use without spoilage from spontaneous gellation or setting.

As heretofore discussed, hot-pressed plywood is extensively manufactured using urea-formaldehyde resin adhesives, melamine-formaldehyde resin adhesives and melamine-urea-formaldehyde resin adhesives. The properties and desirability and quality of the plywood vary according to the adhesive. The plywood products glued with melamine-formaldehyde resin and melamine-urea-formaldehyde resin have proved highly desirable because the bond will survive unlimited exposure to moisture. However, the urea-formaldehyde resins have been used in commercial operations to a much greater extent since they are much more reactive in the hot press and can be pressed at substantially shorter times than the melamine-formaldehyde and melamine-urea-formaldehyde adhesives. The latter two resins besides being handicapped by low press capacity, have required such lengthy press cycles that the panels come out of the press very dry and in most instances must receive a tedious remoistening stage to bring the panels back to the necessary commercial range of between 6–10% moisture content.

In contrast to these limitations, the urea-formaldehyde glues avoid all these difficulties and produce panels directly upon discharge from the hot press at desirable moisture content and high press capacity. Thus there has been a long-standing need in view of the well recognized advantages of the melamine-formaldehyde and melamine-urea-formaldehyde resins bond to find some technique of producing such plywood panels without the serious disadvantage of costly low production rate and an additional remoistening stage.

The present technique overcomes these disadvantages of the melamine-formaldehyde resins and the melamine-urea-formaldehyde resins by providing a new type of catalyst system utilizing an ammonium fluoride, particularly ammonium bifluoride as the catalyst. The new system is of such superior reactivity that the panels can be readily pressed with considerably greater speed than before, and also at substantially shorter press cycles. The effect of this degree of reactivity permits the plywood panels to be brought out of the hot press at a high enough moisture content so that the expensive remoistening step or stage is unnecessary.

The amounts of the respective ingredients may be varied appreciably depending upon various manufacturing factors. However, preferred formulations are as follows:

FORMULATION I

|  | Preferred wt. percent | Range |
| --- | --- | --- |
| Reichhold melamine-formaldehyde Diaron 28-000 [1] | 48.2 | 40-60 |
| Pecan shell flour | 14.5 | 10-18 |
| Water | 36.1 | 30-42 |
| Ammonium bifluoride (70.14% HF) | 0.2 | 0.05-0.5 |
| Ammonium hydroxide 26° Bé | 1.0 | 0.7-1.3 |
| Total | 100.0 |  |

[1] Reichhold melamine-formaldehyde Diaron 28-000:
 (a) Product description: Diaron 28-000 is a white free flowing powdered melamine-formaldehyde adhesive resin developed for high quality laminating, bonding or gluing.
 (b) Physical properties: Form—free flowing powder; Color—white; pH—8.8.
 (c) Molecular weight of resin unit: Melamine-formaldehyde—Range—200-800.
 (d) Percent by wt. melamine in resin: 10% to 90%, preferred 50%.

FORMULATION II

|  | Wt. percent preferred | Range |
| --- | --- | --- |
| Borden's melamine-urea-formaldehyde [1] (MU 658) | 60.0 | 50-70 |
| Water | 39.4 | 40-50 |
| Ammonium bifluoride | 0.3 | 0.1-0.6 |
| Ammonium hydroxide 26° Bé | 0.3 | 0.1-0.6 |
| Total | 100.0 |  |

[1] Borden's melamine-urea-formaldehyde (MU 658):
 Product description: Melamine-urea-formaldehyde (MU 658).
 Physical properties: Form—free-flowing powder; Color—light tan; pH—8.8±0.2 (100 powder/65 water); Viscosity—1500±300 cps. (100 powder/65 water).

Storage life: Months
  At 50° F ------------------------------------------ 12
  At 70° F ------------------------------------------ 9
  At 90° F ------------------------------------------ 4
  At 110° F ----------------------------------------- 2

Mix proportions (by weight): 100 parts MU 658; 60-65 parts water.
 Mix directions:
  (1) Place ⅓ to ½ the water in the mixer and add all the MU-658.
  (2) Mix to a smooth paste.
  (3) Add remaining water and mix smooth. Water may be varied as indicated to adjust mix viscosity as desired.
  (4) Add catalyst and mix 5 minutes.
 Liquid working life of mix:

Temperature: Life, hours
  70° F ------------------------------------------- 14
  90° F ------------------------------------------- 7

Molecular weight of resin unit: Melamine-formaldehyde—Range 200-800. Urea-formaldehyde—Range 90-500.
 Percent wt. melamine—Range 30%–50%
 Percent urea—Range 30%–60% } Remainder formaldehyde.

General properties of preferred resin are as follows:

(1) Melamine-formaldehyde resins in general (a) Resin description: It may be a free flowing powder or liquid, either filled or unfilled, developed for laminating, bonding, gluing, molding or finishing.
(b) Physical properties:
Form—Powder or liquid, filled or unfilled
Color—White to tan
pH—7.0–11.0
(c) Molecular weight of resin unit: Range 100–1200+
(d) Percent melamine in resin formaldehyde. 10% to 90% by wt.

(2) Melamine-urea-formaldehyde resins in general (a) Resin description: It may be a free flowing powder or liquid, either filled or unfilled, developed for laminating, bonding, gluing, molding or finishing
(b) Physical properties:
Form—Powder or liquid, filled or unfilled
Color—White to tan
pH—7.0–11.0
(c) Molecular weight of resin unit:
Range melamine-formaldehyde—100–1200+
Urea-formaldehyde—50–1000+
(d) Percent wt.:
Melamine—Range 10–50%
Urea—Range 30–40%
Remainder, Formaldehyde Thus press cycle may vary from about 0.5 to 3.0 minutes, preferably 1 to 2 minutes such as 1.5 minutes. The temperature during the press may vary from about 100° F. to 300° F. preferably about 225° F. to 275° F., such as about 250° F. Pressures are in the range from about 125 to 225 p.s.i., such as about 150 p.s.i.

In order to further illustrate the invention the following examples are given. These examples illustrate the operation of the invention under a variety of conditions and with various materials. It is understood that in commercial practice the quantities of ingredients for a batch will be greatly increased but the relative proportions shown in the examples are generally retained.

EXAMPLE I

This example illustrates a presently used formula and procedure with commercially available materials where it is desired to produce the adhesive in convenient liquid form with a fairly long pressing cycle:

| | Grams |
|---|---|
| Reichhold melamine-formaldehyde resin—Diaron 28–000 | 200 |
| Pecan shell flour | 60 |
| Water | 150 |
| Ammonium chloride (68.17% HCl) | 0.8 |
| Ammonium hydroxide 26° Bé. | 1.6 |
| | 412.4 |

The glue batch was mixed by putting about a third of the water in the mixer and a mixture of melamine-formaldehyde resin and pecan shell is added slowly using the heavy shearing action of the mixer which removes all of the lumps. The remainder of the water was added leaving a small amount with the ammonium chloride and aqueous ammonia dissolved in it until last. The batch was mixed for five minutes and then ready for use. This formula gives a pot life of about six hours at 75° F. and three hours at 110° F. Fifteen minutes were needed for assembly and then the panels were pressed for four minutes in the hot press openings at 250° F. using a hydraulic pressure of 150 p.s.i. The ¼" plywood structure consists of Birch faces, ⅛" Lauan core and Lauan backs.

The plywood was then tested according to Commercial Standard Bulletin CS35–61. The tests consisted of running the boil test and shear tests. The specimens are boiled for four hours, dried for twenty hours at 145° F.; boiled for an additional four hours and then shear tested while wet. All the panels readily passed the test showing fairly high shear strengths and especially high percent of wood failure; the latter being well in excess of the 50% average required by the test. (See Table I, Row A.) It should be noted that when this formula in Example I is used with a one minute press cycle the adhesive fails to cure and the structure falls apart when removed from the press. (See Table I, Row B.)

EXAMPLE II

This example illustrates the operation of the present invention using ammonium bifluoride with melamine-formaldehyde resins.

| | Grams |
|---|---|
| Reichhold melamine-formaldehyde resin—Diaron 28–000 | 200 |
| Pecan shell flour | 60 |
| Water | 150 |
| Ammonium bifluoride (70.14% HF) | 0.8 |
| Ammonium hydroxide 26° Bé. | 4 |
| | 414.8 |

The mixing and hot pressing procedures of Example I were followed except that the press cycle was shortened to one minute, and the catalyst was changed. Because of the increased reactivity of this catalyst the aqueous ammonia was increased to lengthen pot life. The pot life is about six hours at 75° F. and two hours at 110° F. Results with this mix were as good as Example I in the shear and boil tests. (See Table I, Row C.)

EXAMPLE III

This example illustrates the use of the ammonium chloride catalyst with melamine - urea - formaldehyde resins.

| | Grams |
|---|---|
| Borden's chemical melamine - urea - formaldehyde resin MU 658 | 100 |
| Water | 65 |
| Ammonium chloride | 0.5 |
| Ammonium hydroxide | 0.5 |
| | 166.0 |

The mixing and press conditions were the same as in Example I using the four minute press cycle. The boil and shear test results are comparable with those in Examples I and II. (See Table I, Row D.) This mix gives a pot life of six hours at 75° and two hours at 110° F. It should be noted that when this formula in Example III is used with a one minute press cycle, the bond quality is noticeably decreased. (See Table I, Row E.)

EXAMPLE IV

This example illustrates the use of ammonium bifluoride catalyst with melamine-urea-formaldehyde resins.

| | Grams |
|---|---|
| Borden's melamine-urea-formaldehyde resin MU 658 | 100 |
| Water | 65 |
| Ammonium bifluoride | 0.5 |
| Ammonium hydroxide | 0.5 |
| | 166.0 |

The mixing and press conditions are the same as those in Example I (Row A) except that the press cycle is shortened to one minute and the catalyst is changed. The boil and shear test results are comparable to those of Examples I, II, and III. (See Table I, Row F.) This mix gives a pot life similar to that recorded in Example III.

Use of the present catalyst system permits a substantial gain in pressing time since previously, melamine-formaldehyde and melamine-urea-formaldehyde resins require about four minutes to press the same assemblies with the press plates heated to about 250° F. It is noted that the present catalyst system does shorten the cure time by at least three minutes, thereby materially increasing the production rate.

Another desirable property which is new for melamine and melamine-urea-formaldehyde resin plywood is the consistent absence of thin panel warpage. This has hitherto been somewhat objectionable, particularly when the panels must be processed through sanding and prefinishing machinery.

Urea-formaldehyde resins in general (a) Resin description: It may be free flowing powder or liquid, either filled or unfilled developed for laminating, bonding, gluing, molding or finishing.
(b) Physical properties:
Form—Powder or liquid, filled or unfilled
Color—White to tan
pH—7.0–11.0
(c) Molecular weight of resin unit: Range 50–1000+
(d) Percent wt. urea—In resin: 10–90%

SHEAR TEST FOR PLYWOOD HAVING MELAMINE AND MELAMINE-UREA-FORMALDEHYDE GLUE LINES CATALYZED WITH AMMONIUM CHLORIDE AND AMMONIUM BIFLUORIDE

| | | Dry shear test | | Cyclic boil test | | |
|---|---|---|---|---|---|---|
| Adhesive system | Catalyst system | Breaking load (p.s.i.) | Percent wood failure | Breaking load (p.s.i.) | Percent wood failure | Comments |
| Row A. Melamine formaldehyde [1] | Ammonium chloride | 175 | 80 | 190 | 100 | All plywood samples were pressed at 250° F. at 150 p.s.i. for four minutes (control). |
| | | 150 | 100 | 135 | 100 | |
| | | 150 | 100 | 255 | 100 | |
| | | 130 | 100 | 195 | 100 | |
| | | 150 | 100 | 220 | 100 | |
| Average | | 151 | 96 | 199 | 100 | |
| Row B. Melamine formaldehyde | Ammonium chloride | | | | | Bonds failed to set at 250° F. at 150 p.s.i. for one minute. |
| Row C. Melamine formaldehyde [2] | Ammonium bifluoride | 165 | 100 | 130 | 100 | All plywood samples were pressed at 250° F. at 150 p.s.i. for one minute. |
| | | 160 | 100 | 110 | 60 | |
| | | 160 | 100 | 130 | 90 | |
| | | 180 | 100 | 110 | 100 | |
| | | 185 | 100 | 130 | 100 | |
| Average | | 170 | 100 | 122 | 90 | |
| Row D. Melamine urea formaldehyde [2] | Ammonium chloride | 140 | 100 | 120 | 100 | All plywood samples were pressed at 250° F. at 150 p.s.i. for four minutes. |
| | | 150 | 90 | 125 | 100 | |
| | | 135 | 95 | 135 | 100 | |
| | | 145 | 100 | 125 | 100 | |
| | | 150 | 100 | 130 | 100 | |
| Average | | 145 | 97 | 127 | 100 | |
| Row E. Melamine urea formaldehyde | Ammonium chloride | 170 | 95 | 160 | 80 | All plywood samples were pressed at 250° F. at 150 p.s.i. for one minute. |
| | | 200 | 90 | 180 | 50 | |
| | | 180 | 90 | 140 | 70 | |
| | | 165 | 85 | 160 | 70 | |
| | | 205 | 90 | 100 | 55 | |
| Average | | 184 | 90 | 148 | 65 | |
| Row F. Melamine urea formaldehyde [2] | Ammonium bifluoride | 170 | 100 | 185 | 100 | Do. |
| | | 175 | 100 | 205 | 100 | |
| | | 160 | 100 | 195 | 100 | |
| | | 150 | 100 | 170 | 100 | |
| | | 145 | 100 | 200 | 100 | |
| Average | | 160 | 100 | 191 | 100 | |

[1] Pot life 3 hr. at 110°, 6 hr. at 75°.
[2] Pot life 2 hr. at 110°, 6 hr. at 75°.

EXAMPLE V

This example illustrates the use of the ammonium sulfate catalyst and ammonium chloride catalyst with urea-formaldehyde resins. As pointed out, urea-formaldehyde resin adhesives are much more reactive in the hot press and can be pressed for substantially shorter times than the melamine-formaldehyde and melamine urea-formaldehyde resin adhesives that do not use the ammonium bifluoride catalyst system. Pressing cycles range as low as one minute at 250° F. and 150 p.s.i.

| | Formulation | |
|---|---|---|
| | I, grams | II, grams |
| Borden's CR-5H urea-formaldehyde resin [1] | 185 | 185 |
| Wheat flour | 100 | 100 |
| Pecan shell | 15 | 15 |
| Water | 115 | 115 |
| Ammonium sulfate | 5.5 | 0 |
| Ammonium chloride | 0 | 5.5 |
| Ammonium hydroxide | 3.5 | 3.5 |

[1] Borden's urea-formaldehyde (CR-5H):
(a) Product description—It is supplied as a milky white liquid containing 65% resin solids by weight.
(b) Physical properties—Form, liquid; color, milky white; pH, 7.7 at 25° C.; viscosity, 500–700 centipoises.
(c) Molecular weight of resin unit—Urea-formaldehyde, range 90–500.
(d) Percent urea-formaldehyde, range 64–66%.

Both batches were mixed by weighing out the urea-formaldehyde resin in a mixing vessel and the wheat flour and pecan shell is added and mixed in. After the heavy shearing action of the mixer, which removes the lumps, the water is added gradually leaving a small portion out with the catalyst and aqueous ammonia dissolved in it. This portion is added last and the batch is mixed for five minutes before use.

The resulting glue bonds meet all requirements for Type II plywood as specified in Commercial Standard CS35-61.

EXAMPLE VI

This examples shows the advantages of ammonium bifluoride catalyst with urea-formaldehyde resins over the ammonium sulfate catalyst or ammonium chloride catalyst used in Formulations I and II of Example V.

| | Grams |
|---|---|
| Borden's CR-5H urea formaldehyde resin | 185 |
| Wheat flour | 100 |
| Pecan shell | 15 |
| Water | 115 |
| Ammonium bifluoride | 2.0 |
| Ammonium hydroxide | 3.5 |

This batch gives a pot life of six hours at 75° F. and two hours at 110° F.

The mixing procedures are similar to those given in Example V. It should be noted that a much smaller quantity of ammonium bifluoride is necsssary to develop the same quality bonds as obtained with more than twice the amount of the ammonium sulfate or ammonium chloride catalyst. These glue bonds meet the same specifications as stated in Example V.

In the field of protective surface coatings, mouldings and laminates it is noted that the present invention permits faster curing of clear and pigmented water disposition and emulsion type coatings, mouldings, and laminates having binder resins based on melamine, melamine-urea and urea-formaldehyde resins.

EXAMPLE VII

This example illustrates the use of the ammonium bifluoride catalyst to speed the cure of amino coatings, mouldings and laminates.

Formulas for the various coatings, mouldings and laminates used in this example are based on the respective formulas given in Examples II, IV, VI. In the case of coatings and laminates, the filler can be reduced or deleted along with a corresponding amount of water to control the working viscosity. Surface coating conditions comprise the preheating of the substrate in the range of about 250 to about 280° F. and applying a coating of about three mils with the various amino formulations followed by curing at about 250° F. Cure times for the various resins are as follows:

|  | Range, min. |
|---|---|
| Melamine formaldehyde, about 3 min. | 2 to 4 |
| Melamine-urea-formaldehyde, about 3 min. | 2 to 4 |
| Urea-formaldehyde, about 2 min. | 1 to 3 |

With thinner coatings the cure times will be proportionately shorter. The amino resin coatings can be applied to unheated substrates also, but the drying schedule should be for greater periods of time.

Conditions for producing laminates comprise applying the adhesives to about twenty sheets of paper and pressing in the hot press at about 250° F. at about 990#/sq. in. (range about 900#/sq. in. to 1100#/sq. in.). The laminate produced is approximately 80 mils thick. Cure times for the various resins are as follows:

|  | Range, sec. |
|---|---|
| Melamine formaldehyde, about 1 min. | 60 to 90 |
| Melamine urea formaldehyde, about 1 min. | 60 to 90 |

The curing times will vary somewhat with laminate thickness.

EXAMPLE VIII

In other tests melamine and melamine-urea-formaldehyde formulas similar to those given in Examples II and IV were introduced into a cold mold at atmospheric pressure and cured at 250° F. for twenty minutes.

Adequate cure and good fidelity of mold patterns were obtained. With increasing mold and resin preheat, faster cures are obtained. With small mold sizes, cure rates will approximate those obtained in plywood pressing. The level of preheat and mold temperature for various mold sizes and pressures will be obvious to those skilled in the art.

Thus the catalyst levels in urea-formaldehyde molding resins can be reduced by at least 50% through the use of ammonium bifluoride. Curing rates are maintained at levels comparable with that obtained with ammonium sulfate or ammonium chloride on similar schedules.

When using melamine-formaldehyde resin or melamine-urea-formaldehyde resin the curing rate and thus the plywood production rate can be greatly increased.

The embodiments of the invention in which an exclusive property or privilege is claimed are defined as follows:

1. An improved resin glue catalyst system having improved pot life and curing time which consists essentially of, in parts by weight, 200 parts of a melamine formaldehyde water soluble resin, said resin characterized by having a white color, a pH of about 8.8, a molecular weight in the range of 200 to 800 and containing about 50% by weight of melamine, 60 parts of pecan shell flour, 150 parts of water, 0.8 part of ammonium bifluoride, and 4 parts of ammonium hydroxide.

2. Process for the preparation of resin glue catalyst system having improved pot life wherein, by weight, about 200 parts of melamine formaldehyde resin and 60 parts of pecan shell flour is initially mixed with about 50 parts of water to form a paste, said resin characterized by having a white color, a pH of about 8.8, a molecular weight in the range of 200 to 800 and containing about 50% by weight of melamine, and thereafter about 100 parts of water containing about 0.8 part of ammonium bifluoride and about 4 parts of ammonium hydroxide is added to said paste and mixed for about 5 minutes.

References Cited

UNITED STATES PATENTS

| 2,591,771 | 4/1952 | Bergey | 260—29.4 X |
| 2,413,624 | 12/1946 | Harris | 260—29.4 X |
| 3,100,754 | 8/1963 | Booth et al. | 260—29.4 |
| 3,135,710 | 6/1964 | Benneville | 260—29.4 |

DONALD J. ARNOLD, Primary Examiner

J. B. LOWE, Assistant Examiner

U.S. Cl. X.R.

260—29.4 R, 67.6 R